(12) United States Patent
Ye et al.

(10) Patent No.: US 8,297,802 B2
(45) Date of Patent: Oct. 30, 2012

(54) OPTICAL FILM HAVING LINEAR PROTRUSIONS WITH INWARDLY CURVED RIDGES AND BACK LIGHT MODULE WITH THE OPTICAL FILM

(75) Inventors: Zhi-Ting Ye, Miaoli County (TW); Chun-Chih Huang, Kaohsiung County (TW)

(73) Assignee: Wintek Corporation, Taichung (TW)

( * ) Notice: Subject to any disclaimer, the term of this patent is extended or adjusted under 35 U.S.C. 154(b) by 516 days.

(21) Appl. No.: 12/576,247

(22) Filed: Oct. 9, 2009

(65) Prior Publication Data

US 2011/0085349 A1    Apr. 14, 2011

(51) Int. Cl.
    *F21V 5/02* (2006.01)
(52) U.S. Cl. ........ 362/339; 362/337; 362/333; 362/340; 362/620; 362/627
(58) Field of Classification Search ................. 362/606, 362/618, 619, 620, 627, 628, 222, 223, 311.01, 362/311.06–311.1, 330, 331, 333, 339, 337
    See application file for complete search history.

(56) References Cited

U.S. PATENT DOCUMENTS

| | | | | |
|---|---|---|---|---|
| 1,562,835 A * | 11/1925 | Kuttler | ............................ | 359/547 |
| 5,833,344 A * | 11/1998 | Arai et al. | ...................... | 362/620 |
| 6,290,364 B1 * | 9/2001 | Koike et al. | ................... | 362/620 |
| 6,540,382 B1 * | 4/2003 | Simon | ........................... | 362/339 |
| 6,568,819 B1 * | 5/2003 | Yamazaki et al. | ............ | 362/619 |
| 6,669,350 B2 * | 12/2003 | Yamashita et al. | ............ | 362/612 |
| 7,154,572 B2 * | 12/2006 | Lee et al. | ......................... | 349/61 |
| 7,740,383 B2 * | 6/2010 | Chang | ............................ | 362/338 |
| 7,740,391 B2 * | 6/2010 | Lai et al. | ....................... | 362/625 |
| 7,789,538 B2 * | 9/2010 | Epstein et al. | ................. | 362/333 |
| 2005/0099815 A1 * | 5/2005 | Kim et al. | ...................... | 362/339 |
| 2007/0047260 A1 | 3/2007 | Lee et al. | | |
| 2007/0201246 A1 | 8/2007 | Yeo et al. | | |

FOREIGN PATENT DOCUMENTS

TW        200724974        7/2007

\* cited by examiner

*Primary Examiner* — Ismael Negron
(74) *Attorney, Agent, or Firm* — Jianq Chyun IP Office

(57) ABSTRACT

An optical film includes a body and a plurality of first linear protrusions. The body has a first surface and a second surface opposite to the first surface. The first linear protrusions are disposed on the first surface, and each first linear protrusion is extended along a first direction and has a first curvy ridge line departing from the first surface, wherein the first curvy ridge lines are concave towards a fixed direction. When the first curvy ridge line is located on a suppositional plan, the suppositional plan is not parallel to the first surface. A ratio of a maximum distance between each of the first curvy ridge line and the first surface over a minimum distance between the corresponding first curvy ridge line and the first surface is greater than 1 but less than 8.

18 Claims, 6 Drawing Sheets

OPTICAL FILM HAVING LINEAR PROTRUSIONS WITH INWARDLY CURVED RIDGES AND BACK LIGHT MODULE WITH THE OPTICAL FILM

BACKGROUND OF THE INVENTION

1. Field of the Invention

The present invention generally relates to an optical film and a back light module, and more particularly, to an optical film unlikely scraped and a back light module using the optical film.

2. Description of Related Art

FIG. 1 is a diagram of a conventional backlight module. Referring to FIG. 1, a backlight module 100 includes a set of light sources 110, a reflective plate 120, a light guide plate (LGP) 130 and a plurality of optical films 140. The LGP 130 has a light incidence surface 132 and a light-emitting surface 134 connecting the light incidence surface 132. The set of light sources 110 is disposed beside the light incidence surface 132 of the LGP 130, and the optical films 140 are disposed over the light-emitting surface 134. Besides, the LGP 130 is sandwiched between the reflective plate 120 and the optical films 140.

In fact, the light emitted by the set of light sources 110 is reflected by the reflective plate 120 and then passes through the LGP 130 so as to provide a planar light source for the LCD to display. The employed optical films 140 are used to further promote the light-emitting effect and the light usage efficiency of the backlight module 100. A common optical film 140 basically includes a diffuser and two brightness-enhancing films as a combination. The optical film 140 having a prism structure is usually served as a brightness-enhancing film, wherein the prism structure is suitable to concentrate the light emitted from the set of light sources 110 for increasing the light-emitting luminance of the backlight module 100 effectively. In this way, the optical films 140 enable the backlight module 100 to have higher light usage efficiency and reduced power consumption.

However, when applying a backlight module 100 in a portable information product, the sharp protrusion portions of the prism structure may be unexpectedly worn by friction and get passivated. Additionally, the sharp protrusion portions of the prism structure may also scrap other films or elements. Thus, the optical effect of the optical films 140 gets deteriorated and the backlight module 100 is accordingly unable to remain in the optimum light-emitting state as well.

SUMMARY OF THE INVENTION

Accordingly, the present invention is directed to an optical film to solve the problem that a bright-enhancing film is easily worn.

The present invention is also directed to a backlight module to solve the problem that the optical film in the backlight module is easily worn.

The present invention provides an optical film, which includes a body and a plurality of first linear protrusions. The body has a first surface and a second surface opposite thereto. The first linear protrusions are disposed on the first surface, and each of the first linear protrusions is extended along a first direction and has a first curvy ridge line departing from the first surface, wherein the first curvy ridge line is concave towards a fixed direction. In other words, the first curvy ridge line is curved inward into the first surface. When the first curvy ridge line is located on a first suppositional plan (not shown), the first suppositional plan is not parallel to the first surface.

In an embodiment of the present invention, the cross-section of each of the above-mentioned first linear protrusions is triangle, and the vertex angle of the cross-section departing from the first surface is 40°-120°.

In an embodiment of the present invention, the ratio of the maximum distance between each of the above-mentioned first curvy ridge lines and the first surface over the minimum distance between each of the above-mentioned first curvy ridge lines and the first surface is greater than 1 but less than 8.

In an embodiment of the present invention, the above-mentioned optical film further includes a plurality of second linear protrusions disposed on the second surface. Each of the second linear protrusions is extended along a second direction and has a second curvy ridge line departing from the second surface, wherein the second curvy ridge line is concave towards a fixed direction. When the second curvy ridge line is located on a second suppositional plan, the second suppositional plan is not parallel to the second surface, and the first direction is different from the second direction. For example, the first direction is orthogonal to the second direction.

Besides, the above-mentioned second curvy ridge line is concave towards the second surface. The cross-section of each of the second linear protrusions is triangle, and the vertex angle of the cross-section departing from the second surface is 30°-70°. The cross-section of each of the first linear protrusions can be triangle as well and the vertex angle of the cross-section departing from the first surface is 40°-60°, or the cross-section of each of the second linear protrusions is polygon.

Additionally, the cross-section of each of the second linear protrusions can have a bottom side and a top side connecting the bottom side, wherein the bottom side is located on the second surface and the top side is arc, semi-ellipse or semi-circle. The ratio of the maximum distance between the top side and the bottom side to the width of the bottom side ranges from 1:1 to 1:15. Meanwhile, the cross-section of each of the first linear protrusions can be triangle and the vertex angle of the cross-section departing from the first surface is 90°-110°.

In an embodiment of the present invention, the ratio of the maximum distance over the minimum distance between each of the above-mentioned second curvy ridge lines and the second surface is greater than 1 but less than 8.

In an embodiment of the present invention, the maximum distances between each of the above-mentioned first curvy ridge line and the first surface are different from each other.

The present invention also provides a backlight module, which includes a set of light sources, a light guide plate (LGP), a reflective plate and an optical film aforementioned. The LGP has a light incidence surface and a light-emitting surface connecting the light incidence surface. The set of light sources is located beside the light incidence surface. The optical film is disposed on the light-emitting surface, and the LGP is located between the reflective plate and the optical film.

In the optical film of the present invention, the curvy ridge line of the prism structure is concave towards the body of the optical film. When the optical film of the present invention is assembled with other elements, the prism structure touches the other elements in point contact manner only. Therefore, the optical film of the present invention is not easily worn, and the other elements being contacted with the optical film are not easily worn as well. As a result, the optical film applied in a backlight module is helpful to prolong the lifetime of the backlight module and maintain the light-emitting quality thereof.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
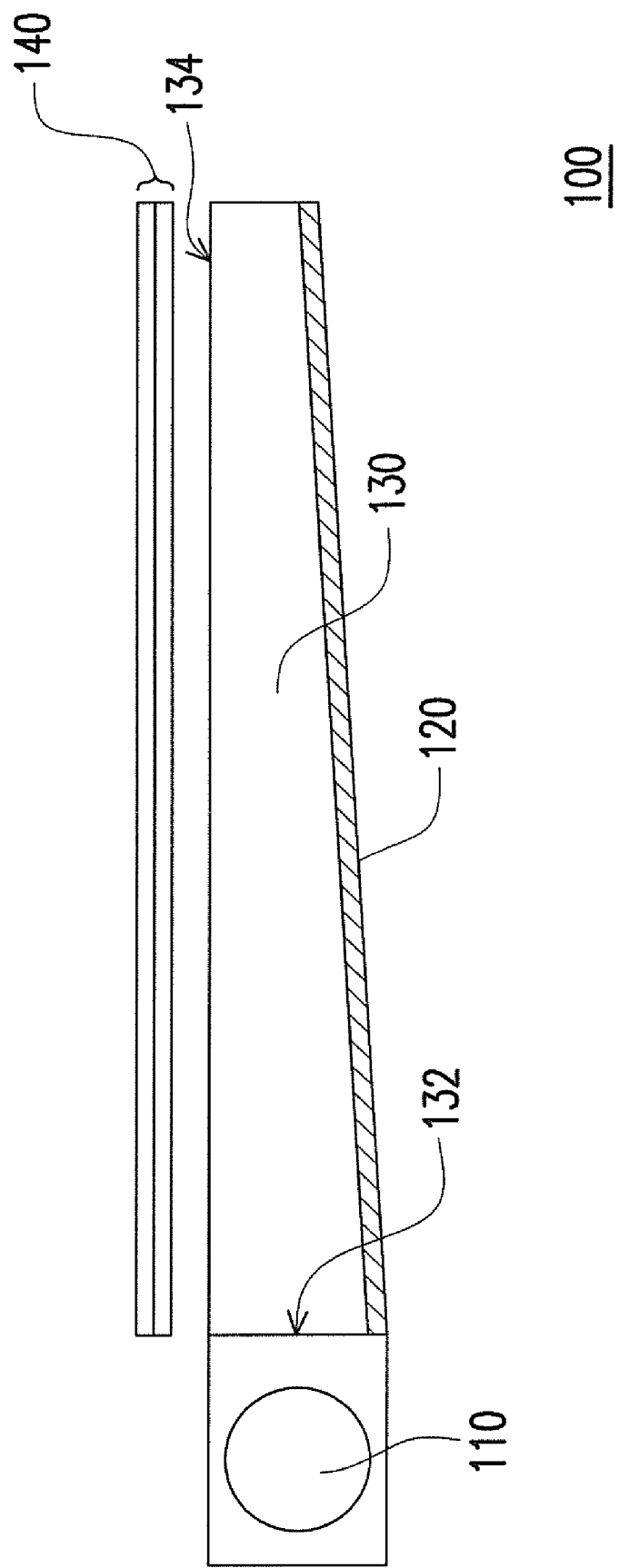
FIG. 1 is a diagram of a conventional backlight module.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
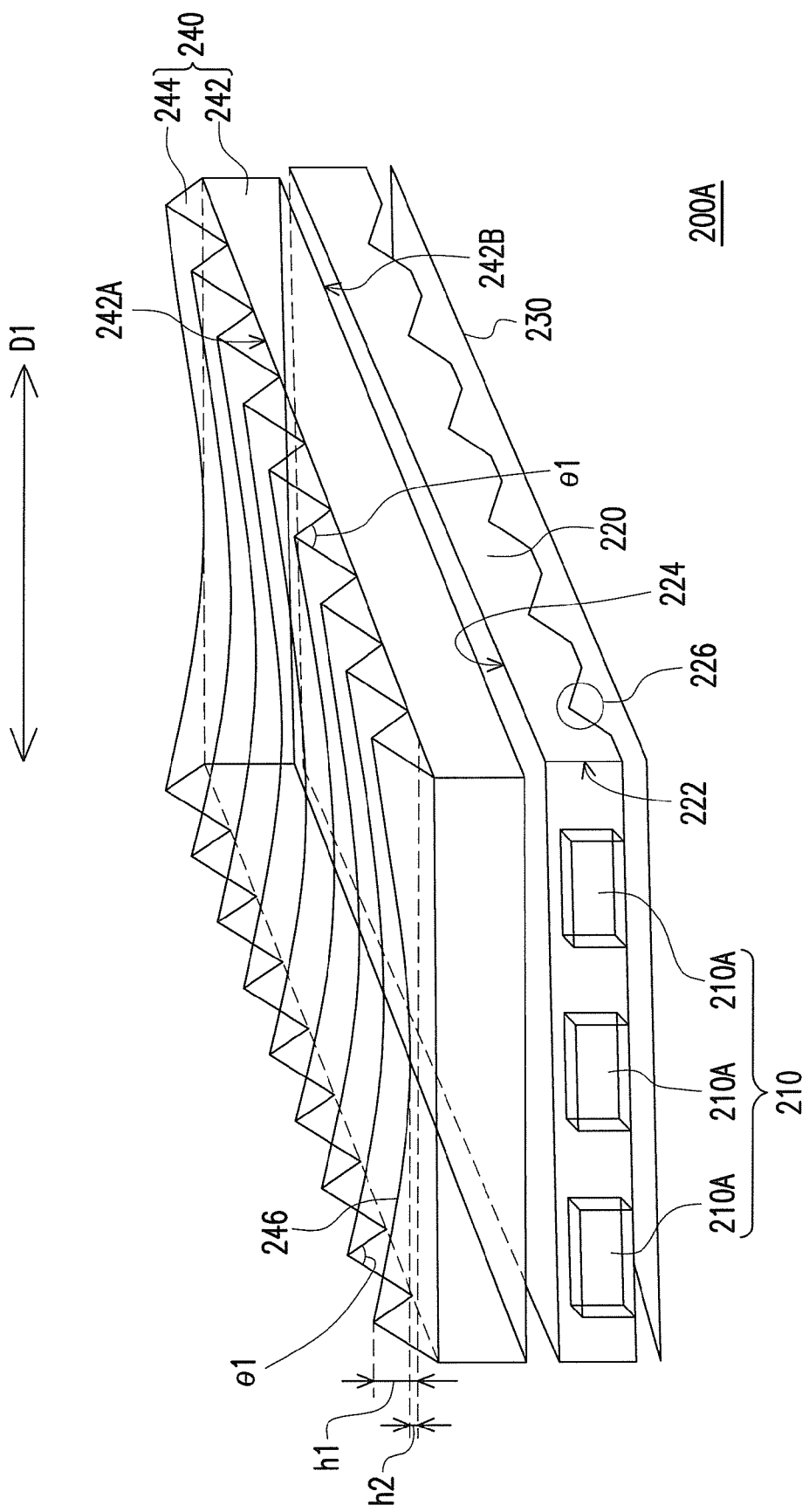
FIGS. 2A and 2B are diagrams of two backlight modules according to an embodiment of the present invention.
Figure 2B:
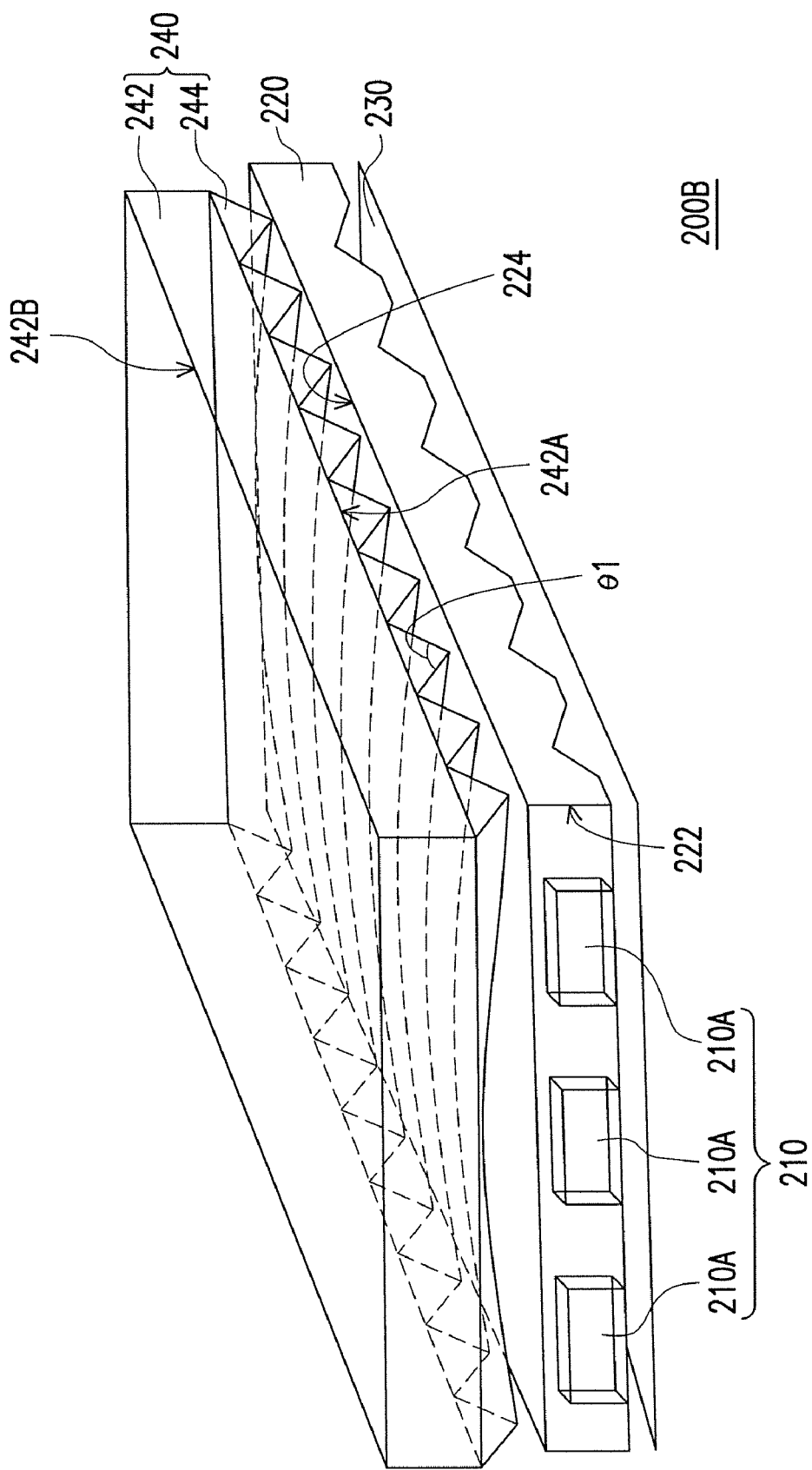

FIGS. 2A and 2B are diagrams of two backlight modules according to an embodiment of the present invention. Referring to FIG. 2A, a backlight module 200A includes a set of light sources 210, an LGP 220, a reflective plate 230 and an optical film 240. The LGP 220 herein has a light incidence surface 222 and a light-emitting surface 224 connecting the light incidence surface 222. The set of light sources 210 is located beside the light incidence surface 222 and the optical film 240 is disposed on the light-emitting surface 224. The LGP 220 is located between the reflective plate 230 and the optical film 240. The set of light sources 210 herein includes at least a plurality of point light sources 210A. The set of light sources 210 however can be composed of a plurality of cold cathode fluorescent lamps (CCFLs) or other light-emitting units as well.

The optical film 240 includes a body 242 and a plurality of first linear protrusions 244. The body 242 has a first surface 242A and a second surface 242B opposite thereto. The first linear protrusions 244 are disposed on the first surface 242A, and each of the first linear protrusions 244 is extended along a first direction D1 and has a first curvy ridge line 246 departing from the first surface 242A, wherein the first curvy ridge line 246 is concave towards a fixed direction. When the first curvy ridge line 246 is located on a suppositional plan (not shown), the suppositional plan (not shown) is not parallel to the first surface 242A. In the present embodiment, the suppositional plane (not shown) is substantially perpendicular to the first surface 242A.

According to the present invention, "the first curvy ridge line 246 is concave towards a fixed direction" means the locus of the first curvy ridge line 246 touches the tangents of the first curvy ridge line 246 at any position thereof at a corresponding tangent point only; that is, the first curvy ridge line 246 is concavely bent towards a fixed, same direction. In the present embodiment, the first curvy ridge line 246 is concave towards the first surface 242A. In other embodiments, however, the first curvy ridge line 246 can be convex towards the direction departing from the first surface 242A. Note that, according to the abovementioned design of the present invention, the distances between the first curvy ridge line 246 and the first surface 242A at different positions of the first curvy ridge line 246 are not constant. Additionally, when the first curvy ridge line 246 is located on a suppositional plan (not shown), the suppositional plan is not parallel to the first surface 242A. Thereby, when other elements are disposed on the optical film 240, the first curvy ridge line 246 would not entirely contact the elements, so that the probability for the optical film 240 to be worn is reduced.

The cross-sections of each of the first linear protrusions 244 taking the first direction D1 as the normal vector of the cross-sections at any position of the first linear protrusions 244 is, for example, triangle. In other words, the first linear protrusions 244 of the embodiment are prism structures extended along the first direction D1. Since the distances between the first curvy ridge line 246 and the first surface 242A at different positions of the first curvy ridge line 246 are not constant, the cross-sections of the first curvy ridge line 246 corresponding to different positions of the first curvy ridge line 246 are triangles with different altitudes. Accordingly, the vertex angles θ1 of the triangles are not constant. Limited by a process accuracy in practice, the cross-sections of each of the first linear protrusions 244 may be not perfectly triangle. Insteadly, the tips of the cross-sections are allowed to be a slightly rounded angle like a fillet, but not a sharp acute angle; however, in macroscopical view, the cross-sections are still regarded as triangles.

Each of the first linear protrusion 244 has a first curvy ridge line 246 concave towards the first surface 242A; thus, once other elements are disposed over the optical film 240, the elements contact the first linear protrusions 244 only at two protruded end-points of the first linear protrusions 244. Accordingly, the worn portions of the first linear protrusions 244 having prism shapes exit at the two protruded end-points thereof only, which largely reduces the probability for the first linear protrusions 244 to be entirely worn, and thereby the light-emitting effect of the backlight module 200A is unlikely degraded for the optical film 240 getting worn.

The first curvy ridge line 246 is concave towards the first surface 242A. Therefore, there are tiny gaps between the first curvy ridge line 246 and the element located over the first curvy ridge line 246 at partial positions. In order to avoid the light-emitting effect of the backlight module 200A from being affected by the above-mentioned gaps, the ratio of the maximum distance h1 over the minimum distance h2 between each of the first curvy ridge lines 246 and the first surface 242A is preferably greater than 1 but less than 8. However, the above-mentioned ratio is an example, and it does not limit the present invention. When the dimensions of the backlight module 200A and the elements thereof are varied somehow, the ratio of the maximum distance h1 over the minimum distance h2 can be varied therewith. Besides, in the present embodiment, the dimensions of the first linear protrusions 244 are exemplarily the same. In other embodiments in contrast, the maximum distances h1 between each of the first curvy ridge line 246 and the first surface 242A can be different. That is to say, each of the first linear protrusion 244 can be designed with different altitudes and different dimensions.

The position which is the most close to the first surface 242A on the first curvy ridge line 246 can be located at any position. In the present embodiment, the position which is the most close to the first surface 242A on the first curvy ridge line 246, i.e., the position with the distance h2 between the first curvy ridge line 246 and the first surface 242A is roughly located at the middle of the first curvy ridge line 246. In other embodiments, the position which is the most close to the first surface 242A on the first curvy ridge line 246 can be located at one of the both ends of the first curvy ridge line 246.

When the backlight module 200A is turned on, the light emitted from the set of light sources 210 enters the LGP 220 from the light incidence surface 222. In general, the LGP 220 has a plurality of microstructures 226 for scattering or reflecting the light. After the light is scattered or reflected, the light would be directly emitted from the LGP 220 or re-reflected by the reflective plate 230, followed by being emitted from the LGP 220. The light emitted from the LGP 220 then enters the optical film 240 and is concentrated towards the center of the surface of the backlight module 200A under the mechanism of the first linear protrusions 244.

If the backlight module 200A is applied in a small information product, such as mobile phone or digital photo frame, the microstructures 226 are, for example, in the form of mesh-patterns distributed in the LGP 220. The design of the microstructure 226 would affect the emitting angle of the light emitted from the backlight module 200A such that the luminance distribution of the light emitted from the backlight module 200A would be asymmetry. Therefore, the present invention makes the vertex angles θ1 of the triangle cross-sections of each of the first linear protrusion 244 adjustable so as to have a more ideal luminance distribution of the light emitted from the backlight module 200A. Taking an example, the vertex angles θ1 departing from the first surface 242A of the triangle cross-sections of each of the first linear protrusion 244 are 40°-120°, and the appropriate vertex angles θ1 of each of the first linear protrusion 244 corresponding to different product designs are varied therewith.

Figure 3:
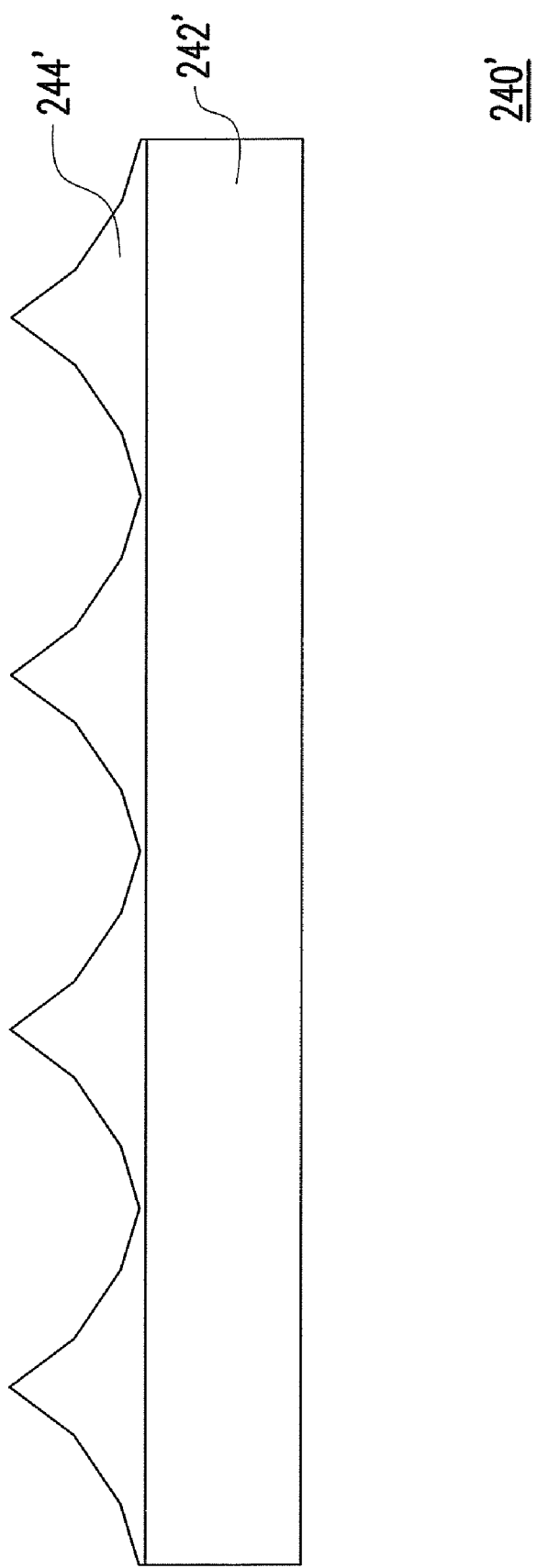
FIG. 3 is a cross-section diagram of an optical film according to an embodiment of the present invention.

In the present embodiment, the second surface 242B is located between the light-emitting surface 224 and the first surface 242A, that is, the first linear protrusions 244 are protruding upwards. In other embodiments, the orientation of the optical film 240 can be upside-down. Referring to FIG. 2B, the first linear protrusions 244 in FIG. 2B face the LGP 220 thereunder; in other words, the first surface 242A of the body 242 can be located between the second surface 242B and the light-emitting surface 224 of the LGP 220 as well. Furthermore, the cross-sections of each of the first linear protrusion 244 are allowed not to be triangle, but polygon. FIG. 3 is a cross-section diagram of an optical film according to an embodiment of the present invention. Referring to FIG. 3, the optical film 240 herein is similar to the above-mentioned optical film 240 and includes a body 242' and first linear protrusions 244' located on the body 242'. In practice, the cross-sections of each of the first linear protrusion 244' are in the form of polygon similar to triangle, wherein the length of the sides of the polygon cross-section and the vertex angles between the sides can be adjusted depending on different product designs. By the above-mentioned design, the optical film 240' still keeps the features and the advantages similar to that of the optical film 240. The cross-sections of the first linear protrusions 244' can be in the form of other shapes, which are not limited to triangle or quasi-triangle.

Figure 4:
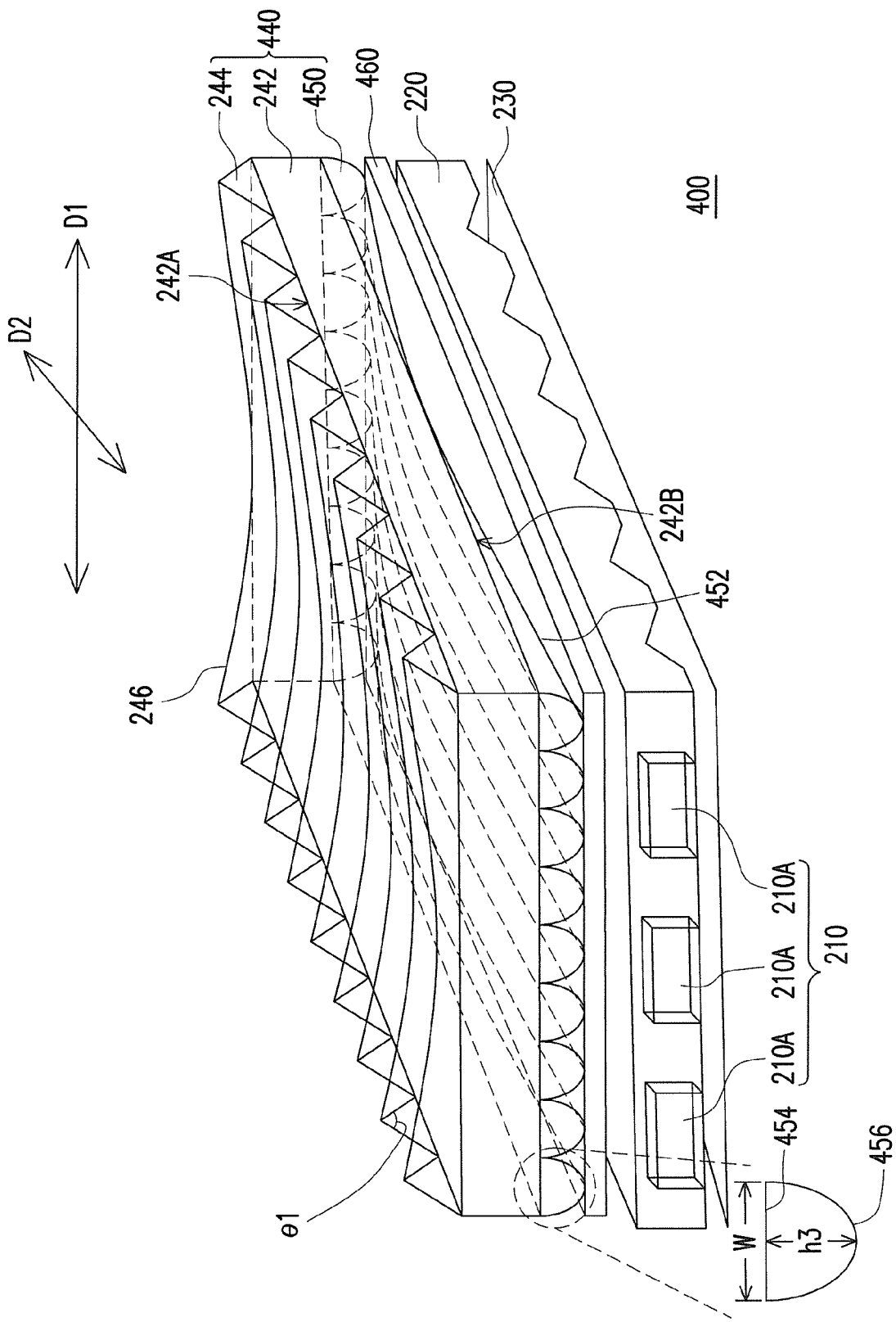
FIG. 4 is a diagram of a backlight module according to another embodiment of the present invention.

FIG. 4 is a diagram of a backlight module according to another embodiment of the present invention. Referring to FIG. 4, the backlight module 400 has partial elements same as the partial ones of the backlight module 200A, and the optical film 440 further includes second linear protrusions 450 located on the second surface 242B. In addition, the second linear protrusions 450 are extended along a second direction D2 and each of the second linear protrusion 450 has a second curvy ridge line 452 departing from the second surface 242B. The second curvy ridge line 452 is concave towards a fixed direction. When the second curvy ridge line 452 is located on a suppositional plan (not shown), the suppositional plan is not parallel to the second surface 242B. In addition, the first direction D1 is different from the second direction D2. In fact, the second curvy ridge lines 452 are concave towards the second surface 242B and the first direction D1 can be perpendicular to the second direction D2 or intersected with the second direction D2 in a certain vertex angle. Herein, the definition of "concave towards a fixed direction" can refer that of the above-mentioned embodiment.

In the backlight module 400, the second linear protrusions 450 of the optical film 440 located on the second surface 242B are not prism structures. The maximum distance between each of the second curvy ridge line 452 and the second surface 242B can be different from each other or the same. In more detail, cross-sections of each of the second linear protrusions 450 taking the second direction D2 as the normal vectors has a bottom side 454 and a top side 456 connecting the bottom side 454. In the embodiment, the bottom side 454 is located on the second surface 242B and the top side 456 is in the shape of arc, semi-ellipse or semi-circle. The top side 456 having the shape of arc, semi-ellipse or semi-circle is helpful to promote the light-diffusing ability of the optical film 440 so that the backlight module 400 has a larger light-emitting angle of view (light-emitting AOV). Accordingly, the backlight module 400 applied in an information product with wide viewing feature is able to provide an ideal light-emitting AOV.

In addition, the ratio of the maximum distance h3 between the top side 456 and the bottom side 454 to the width W of the bottom side 454 roughly ranges from 1:1 to 1:15. The above-mentioned ratio can be varied depending on the vertex angles θ1 in the first linear protrusions 244. In order to make the light-emitting effect of the backlight module 400 even, the backlight module 400 further includes a diffuser 460 disposed between the LGP 220 and the optical film 440.

In comparison with the conventional backlight module 100, the configuration of the backlight module 400 contributes a better light-emitting efficiency. Besides, the design of the curvy ridge lines (246 and 452) in the optical film 440 is apt to reduce the possibility for the optical film 440 to be worn. Therefore, the optical film 440 has a longer lifetime and the backlight module 400 keeps better light-emitting qualities. In other embodiments, the curvy ridge lines 452 of the second linear protrusions 450 may be not in the shape of an arc, but a straight line.

Figure 5:
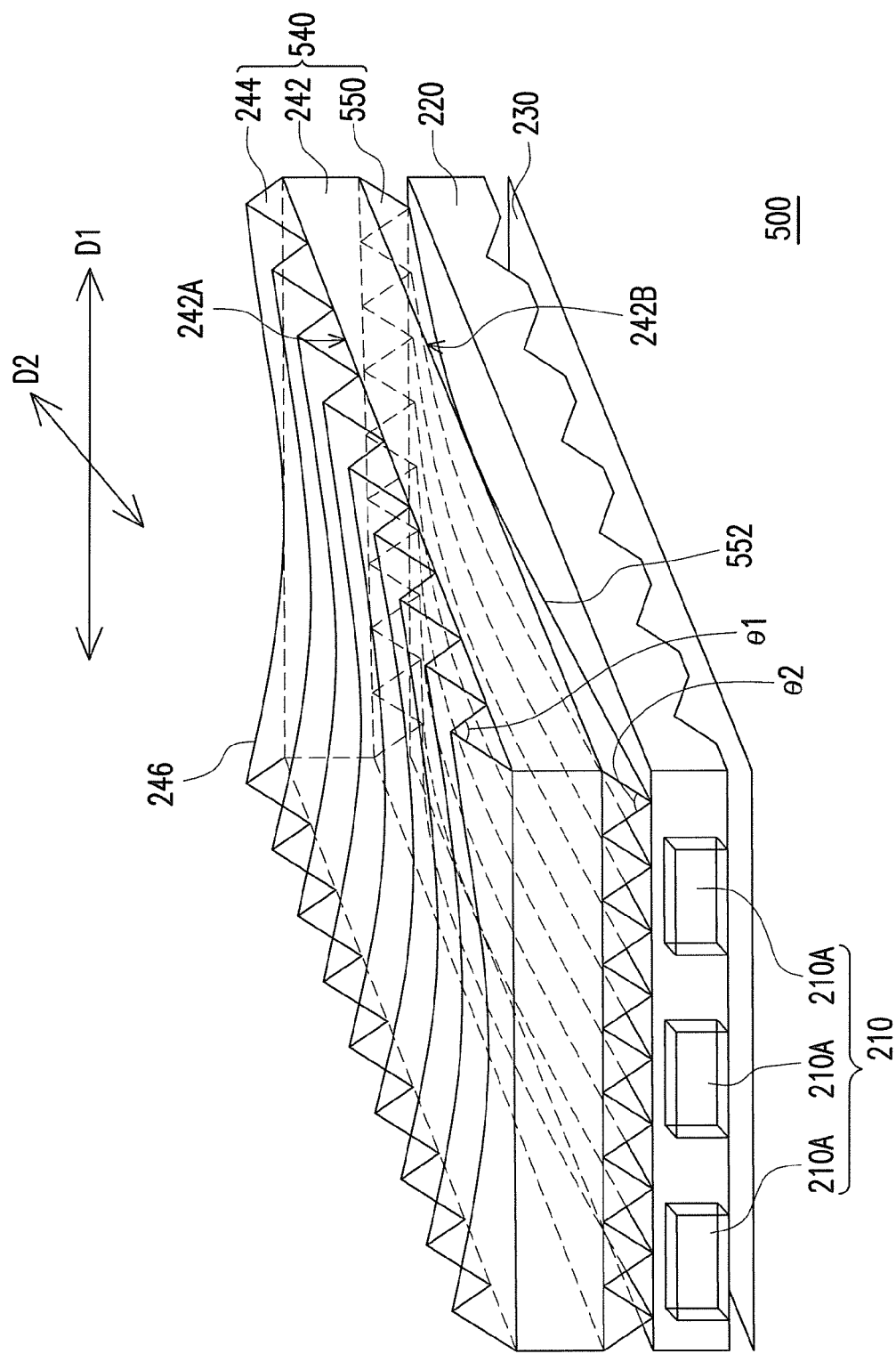
FIG. 5 is a diagram of a backlight module according to yet another embodiment of the present invention.

In addition to the above-mentioned optical films 240, 240' and 440, the present also provides an optical film with another structure applied in a backlight module. FIG. 5 is a diagram of a backlight module according to yet another embodiment of the present invention. Referring to FIG. 5, a backlight module 500 has partial components the same as that in the backlight module 400. In the optical film 540 of the present embodiment, cross-sections of each of the second linear protrusion 550 taking the second direction D2 as the normal vectors are in the shape of triangle. In other words, each of the second linear protrusions 550 is substantially a prism structure as well, and the vertex angles θ2 of the cross-sections of the second linear protrusions 550 departing from the second surface 242B are, for example, 30°-70°.

Certainly, the cross-sections of each of the second linear protrusion 550 can be polygon as shown in FIG. 3. The ratio of the maximum distance (not shown) over the minimum distance (not shown) between each of the second curvy ridge line 552 and the second surface 242B is preferably greater than 1 but less than 8. The wearing of the second linear protrusions 550 can be avoided by properly designing the second curvy ridge lines 552, so that the backlight module 500 retains good light-emitting quality.

In the optical film 540, the two surfaces (242A and 242B) have respectively protrusions (244 and 550), and the extending directions of the first linear protrusions 244 and the second linear protrusions 550 are different from each other. When the light emitted from the LGP 220 and sequentially passes the second linear protrusions 550, the body 242 and the first linear protrusions 244, the light would be concentrated under the mechanism of the prism structures on the optical film 540 and be emitted from the backlight module 500. In other words, the backlight module 500 is capable of providing a more concentrated light source and suitable for an information product having a high demand on the directly-viewing luminance, wherein the directly-viewing luminance means the light luminance viewed from the place right above the backlight module 500.

In an embodiment, the vertex angles θ1 of the first linear protrusions 244 and the vertex angles θ2 of the second linear protrusions 550 can be the same or different from each other, and the vertex angles θ1 of the first linear protrusions 244 can be varied in different structure designs. Taking the optical film 440 of the previous embodiment and the optical film 540 of the present embodiment as examples, the vertex angles θ1 in the optical film 440 are for example 90°-110° and the vertex angles θ1 in the optical film 540 are for example 40°-60°. In fact, the above-mentioned angles are examples only, not to limit the design of the vertex angles θ1 in the optical film 440 and the optical film 540. In other words, the vertex angles θ1 of the optical film 440 and the optical film 540 can be respectively any one angle within 40°-120°.

According to the simulation results, for a design employing the optical film 540 in association with the LGP 220 having mesh-pattern microstructures, and the vertex angles θ1 and θ2 respectively corresponding to the triangle cross-sections of the first linear protrusions 244 and the second linear protrusions 550 are 48°, the directly-viewing luminance of the backlight module 500 is increased by 3.2 times than the light-emitting luminance of a backlight module where no optical film 540 is employed. In addition, the directly-viewing luminance of the backlight module 500 is roughly increased by 1.5 times than that of the conventional backlight module 100 where two prism films, for example two conventional bright-enhancing films, are used to form the optical film 140. Therefore, in addition of reducing damage by friction, the backlight module 500 further has a high quality of light-emitting effect due to the novel structure design of the optical film 540. Moreover, the design of the second linear protrusions 550 being in a reverse prism structure is helpful to make the light-emitting angle of the backlight module 500 more concentrated and generate strong center luminosity so that the back light module 500 is suitable for an information product with high demand on the directly-viewing luminance.

In summary, in the optical film of the present invention, the ridge lines of the protrusion structures are arc-shaped, which is able to reduce the contact area between the optical film and other elements. When the optical film of the present invention rubs the other elements, the probability for the optical film to damage other elements or to be worn is reduced. Therefore, the optical film of the present invention applied in a backlight module is helpful to maintain the good light-emitting quality thereof. In addition, the lifetime of the optical film of the present invention is prolonged and the optical film is able to maintain good optical properties as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical film, comprising:
   a body, having a first surface and a second surface opposite thereto; and
   a plurality of first linear protrusions, disposed on the first surface, wherein each of the first linear protrusions is extended along a first direction and has a first curvy ridge line which is curved inward into the first surface, and when the first curvy ridge line is located on a first suppositional plan, the first suppositional plan is not parallel to the first surface, wherein a ratio of a maximum distance between each of the first curvy ridge line and the first surface over a minimum distance between the corresponding first curvy ridge line and the first surface is greater than 1 but less than 8.

2. The optical film according to claim 1, wherein a cross-section of each of the first linear protrusions is triangle and the vertex angle of the cross-section is 40°-120°.

3. The optical film according to claim 1, wherein a cross-section of each of the first linear protrusions is polygon.

4. The optical film according to claim 1, further comprising a plurality of second linear protrusions disposed on the second surface, wherein each of the second linear protrusions is extended along a second direction different from the first direction and has a second curvy ridge line which is curved inward into the second surface, and when the second curvy ridge line is located on a second suppositional plan, the second suppositional plan is not parallel to the second surface.

5. The optical film according to claim 4, wherein a cross-section of each of the second linear protrusions is triangle, and the vertex angle of the cross-section is 30°-70°.

6. The optical film according to claim 4, wherein a cross-section of each of the first linear protrusions is triangle and the vertex angle of the cross-section is 40°-60°.

7. The optical film according to claim 4, wherein a cross-section of each of the second linear protrusions is polygon.

8. The optical film according to claim 4, wherein a cross-section of each of the second linear protrusions has a bottom side and a top side connecting the bottom side, wherein the bottom side is located on the second surface and the top side is arc, semi-ellipse or semi-circle.

9. The optical film according to claim 8, wherein a cross-section of each of the first linear protrusions is triangle and the vertex angle of the cross-section is 90°-110°.

10. A backlight module, comprising:
    a set of light sources;
    a light guide plate, having a light incidence surface and a light-emitting surface connecting the light incidence surface, wherein the set of light sources is located beside the light incidence surface;
    an optical film, disposed on the light-emitting surface and comprising:
        a body, having a first surface and a second surface opposite thereto; and
        a plurality of first linear protrusions, disposed on the first surface, wherein each of the first linear protrusions is extended along a first direction and has a first curvy ridge line which is curved inward into the first surface, and when the first curvy ridge line is located on a first suppositional plan, the first suppositional plan is not parallel to the first surface; and
    a reflective plate, disposed under the light guide plate, wherein the light guide plate is located between the reflective plate and the optical film.

11. The backlight module according to claim 10, wherein the first surface is located between the second surface and the light-emitting surface.

12. The backlight module according to claim 10, wherein the second surface is located between the first surface and the light-emitting surface.

13. The backlight module according to claim 12, further comprising a plurality of second linear protrusions disposed on the second surface, wherein each of the second linear protrusions is extended along a second direction different from the first direction and has a second curvy ridge line which is curved inward into the second surface, and assuming the second curvy ridge line is located on a second suppositional plan, the second suppositional plan is not parallel to the second surface.

14. The backlight module according to claim 13, wherein a cross-section of each of the second linear protrusions is triangle, and a vertex angle of the cross-section is 30°-70°.

15. The backlight module according to claim 13, wherein a cross-section of each of the first linear protrusions is triangle and a vertex angle of the cross-section is 40°-60°.

16. The backlight module according to claim 13, wherein a cross-section of each of the second linear protrusions is polygon.

17. The backlight module according to claim 13, wherein the cross-section of each of the second linear protrusions has a bottom side and a top side connecting the bottom side, wherein the bottom side is located on the second surface and the top side is arc, semi-ellipse or semi-circle.

18. An optical film, comprising:
a body, having a first surface and a second surface opposite thereto;
a plurality of first linear protrusions, disposed on the first surface, wherein each of the first linear protrusions is extended along a first direction and has a first curvy ridge line which is curved inward into the first surface, and when the first curvy ridge line is located on a first suppositional plan, the first suppositional plan is not parallel to the first surface; and
a plurality of second linear protrusions, disposed on the second surface, wherein each of the second linear protrusions is extended along a second direction different from the first direction and has a second curvy ridge line which is curved inward into the second surface, and when the second curvy ridge line is located on a second suppositional plan, the second suppositional plan is not parallel to the second surface.

* * * * *